(12) United States Patent
Nichols

(10) Patent No.: US 7,185,457 B2
(45) Date of Patent: Mar. 6, 2007

(54) FISHING LURE

(76) Inventor: Mark S. Nichols, 124 SE. Villas St., Stuart, FL (US) 34994

( * ) Notice: Subject to any disclaimer, the term of this patent is extended or adjusted under 35 U.S.C. 154(b) by 0 days.

(21) Appl. No.: 10/801,350

(22) Filed: Mar. 16, 2004

(65) Prior Publication Data

US 2005/0204607 A1    Sep. 22, 2005

(51) Int. Cl.
*A01K 85/00* (2006.01)
(52) U.S. Cl. .................. 43/42.39; 43/42.24; 43/42.37
(58) Field of Classification Search ............... 43/42.39, 43/42.24, 42.37
See application file for complete search history.

(56) References Cited

U.S. PATENT DOCUMENTS

| | | | | |
|---|---|---|---|---|
| 1,546,105 A | * | 7/1925 | Powell | 43/42.37 |
| 2,292,592 A | * | 8/1942 | Wright | 43/42.27 |
| 3,181,265 A | * | 5/1965 | Cook | 43/42.7 |
| 3,611,614 A | * | 10/1971 | Ward | 43/42.24 |
| 3,868,784 A | * | 3/1975 | Sabol | 43/42.23 |
| 4,196,884 A | * | 4/1980 | Zeman | 249/55 |
| 4,843,754 A | * | 7/1989 | Spelts | 43/42.1 |
| 5,070,639 A | * | 12/1991 | Pippert | 43/42.31 |
| 5,220,743 A | * | 6/1993 | McClellan | 43/44.81 |
| 5,396,728 A | * | 3/1995 | Weber | 43/42.37 |
| 5,564,220 A | * | 10/1996 | Blicha | 43/42.32 |
| 5,806,234 A | * | 9/1998 | Nichols | 43/42.37 |
| 6,240,672 B1 | * | 6/2001 | Huppert | 43/44.8 |
| 6,266,916 B1 | * | 7/2001 | Dugan | 43/42.37 |
| 2002/0078619 A1 | * | 6/2002 | Hurtle, Jr. | 43/42.39 |
| 2003/0024150 A1 | * | 2/2003 | Hawkins | 43/42.39 |

* cited by examiner

*Primary Examiner*—Kurt Rowan
(74) *Attorney, Agent, or Firm*—Akerman Senterfitt; Michael K. Dixon

(57) ABSTRACT

A fishing lure having an internal cavity for containing a hook and a weight attached to the hook such that the weight is coupled to the hook closer to a throat of the hook than to a line receiving portion of the hook. The combined hook and weight resist being pulled through a shank containing region of lure. The weight may be positioned in a midsection of the lure enabling the lure to maintain a relatively level attitude in the water while being pulled through the water.

21 Claims, 3 Drawing Sheets

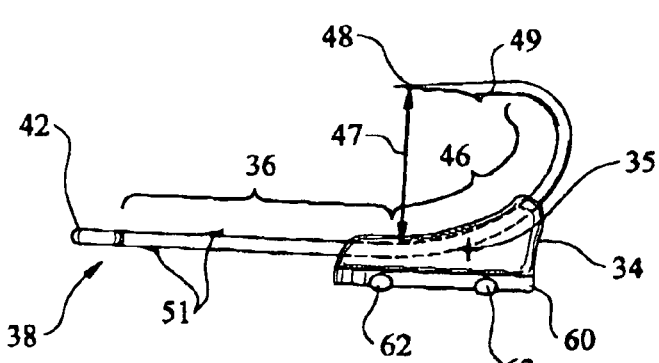
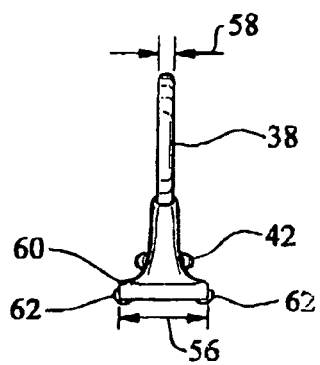
FIG. 8   FIG. 9
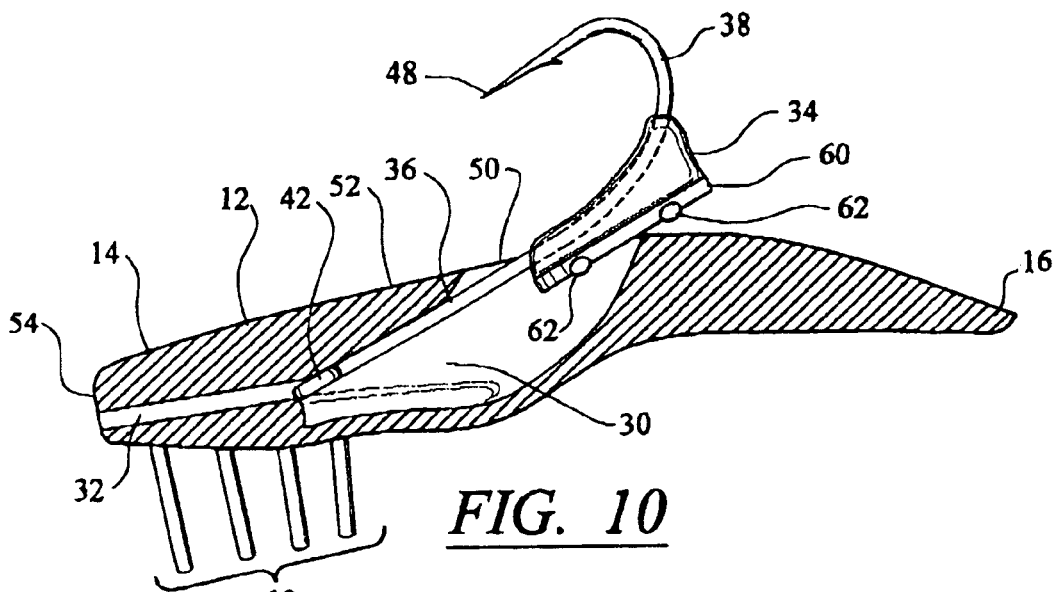
FIG. 10
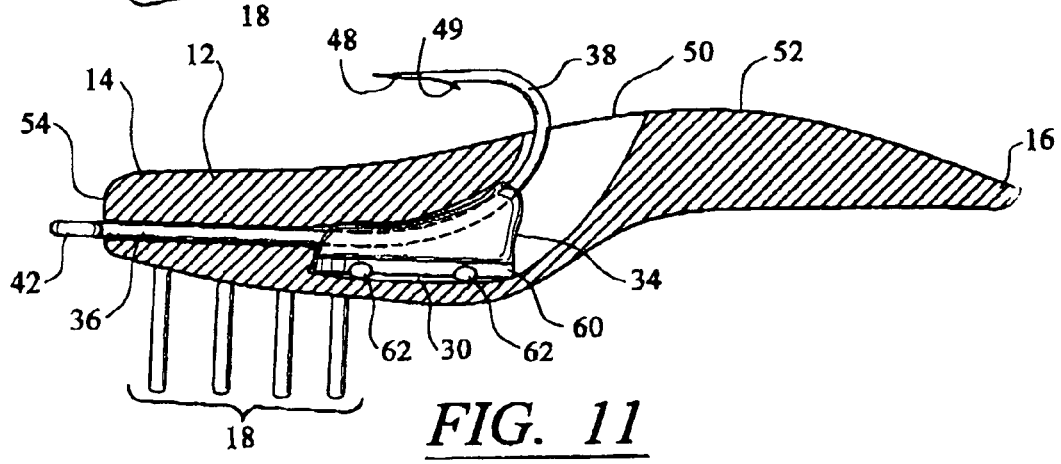
FIG. 11

FISHING LURE

FIELD OF THE INVENTION

This invention is directed generally to fishing lures, and more specifically to soft bodied fishing lures.

BACKGROUND OF THE INVENTION

Artificial lures have been used for many years to catch fish in rivers, lakes, estuaries, bays, and oceans. Artificial lures typically are formed from either hard or soft materials. Hard bodied lures commonly have hooks attached to an outer surface of the lure, while soft bodied lures often have hooks completely concealed within the lure or at least partially concealed in cavities in the lures. Because of the rigidity inherent in hard bodied lures, the hooks are easily attached to the lures such as by screwing an attachment mechanism into the lure. Fish have been known to pull hooks from hard bodied lures, but this is not common. Instead, hooks often straighten or are pulled out of a fish's mouth before being pulled from a lure.

In contrast, soft bodied lures face a much larger challenge in keeping a hook in the body of lure. Most soft bodied lures have one or more hooks inserted into the body such that an eye of the hook protrudes from the body. The hook point may either be buried in the lure body, such as commonly found with a weedless configuration such as a Texas rigged plastic worm or other such lure, or may protrude from the lure. Often times, a soft bodied lure does not have a slot or cavity into which a hook may be inserted. Rather, a hook may be inserted into the lure body by inserting the point of the hook and forcing the point through the body until it protrudes out of the lure body. There exists numerous ways of positioning a hook in a soft bodied lure, which are known to those of ordinary skill in the art and not discussed here.

An example of a particular soft bodied lure is shown in FIG. 1. FIG. 1 shows a cross-section of a soft bodied lure resembling a shrimp. The lure includes a cavity for containing a hook. The cavity generally follows the shape of the hook and enables a point of the hook to protrude through a top surface of the lure while an eye of the hook protrudes through the nose of the lure. A weight may be positioned in bottom aspects of the lure body by inserting the weight through an opening in the bottom surface of the lure. The weight positioned in the midsection of the lure enables a lure to maintain a relatively level attitude in the water, which closely resembles a natural baitfish. Other soft bodied lures have weights positioned near a nose of a lure for use in water deeper than water in which lures having a weight in a midsection are typically used. Both lures provide excellent imitations of different types of baitfish and are designed for use in different situations and different areas of a water body.

During use, the lure is pulled through the water by a line attached to the eye of the hook. After continued use, the cavity in the lure body containing the hook often becomes disfigured or torn due to a host of factors, including, fish strikes, snagging the lure on various structures, impacting the lure against sea walls, docks, pilings, tree limbs, and other structure. Damage from these events may occur after use of the lure for a couple hours or after only a single cast.

When a cavity holding a hook in a soft bodied lure becomes damaged, the hook becomes easier to move from its proper position in the lure, which greatly impacts the lure's ability to entice a fish to strike. For instance, when a cavity of a soft bodied lure becomes damaged, pulling the hook by the line attached to an eye of the hook may cause the eye of the hook to be pulled further out of the nose and cause the bend of the hook to be further inserted into the lure body, as shown in FIG. 2. This causes the lure body to curve into an unnatural position that does not entice fish to strike. Furthermore, a lure body in a position as shown in FIG. 2 does not maintain a natural attitude in the water when pulled through the water. Rather, the lure would spin or roll onto its side. Either action is unnatural and would spook any fish around the lure, thereby defeating the entire reason for using the lure in the first place, which is to entice a fish to strike the lure. A damaged lure body may also allow the hook to rotate relative to the lure body and foul hook itself by allowing the point of the hook to be driven into the body of the soft-bodied lure, thereby further damaging the lure and preventing the hook point from being able to pierce a fish's mouth should a fish strike the fouled lure. Thus, a need exists for positioning a hook in a soft bodied lure that resists movement relative to the lure body even after the lure has been damaged as a result of fish strikes, impacts with seawalls, docks, pilings and other structures, or other such damage.

SUMMARY OF THE INVENTION

This invention is directed to a lure having a combined hook and weight for resisting the hook from being pulled out of a body of the lure when the hook is pulled at a line receiving portion of the hook, such a when the lure is pulled by a fishing line attached to the lure. The lure may be formed from a body having one or more cavities in a midsection of the body. The cavity may be sized to contain the hook and weight and may be accessible through an opening in a surface of the body. The cavity may be formed from a weight containing cavity for containing a weight attached to a hook and a shank containing region for containing a shank of the hook. The cavity may also be formed such that a portion of the hook contacts an inner surface of the cavity thereby resisting the hook from being pulled from the body when the hook is pulled from the line receiving portion of the body. The body may configured in one of numerous shapes, such as a shrimp or other baitfish or crustaceans.

The hook may have a weight attached to a shank of the hook. The weight may have a cross-sectional shape such that when the weight is attached to the hook, the cross-sectional profile of the weight and the hook and the weight is larger than the hook alone. The increase in profile assists in preventing the hook from being pulled from the body through the shank containing region. The weight may be coupled closer to a throat of the hook than to a line receiving portion of the hook so that the hook may be used to position the weight within a midsection of the lure rather than at a nose of the lure. In at least one embodiment, the weight may be coupled to at least a portion of the bend of the hook to prevent the weight from inadvertently detaching from the hook.

The weight may also include a body saving device for decreasing wear on the body by the weight. For instance, the weight may include one or more protrusions extending from the weight for preventing the weight from cutting the body from the inside cavity when the lure strikes a piling, dock, rock pile, limb, or other structure while being cast by an angler. The protrusion may extend from both sides of a base of the weight.

An advantage of this invention is that the lure may be pulled from a line receiving portion of the hook without pulling the hook from the body, even after the lure has endured fish strikes and has been cast into seawalls, docks, pilings, limbs, and other such structures.

Another advantage of this invention is that the lure has a mass midpoint substantially within a midsection of a body of the lure, enabling the lure to maintain a relatively upright position when pulled through the water.

Yet another advantage of this invention is that the weight prevents the hook from being foul hooked into the body.

Still another advantage of this invention is that the base of the weight enhances stability of lure body, thereby assisting to limit the susceptibility of the lure to rolling onto its side when pulled through the water by a line receiving portion of the hook.

These and other embodiments will be described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 8 is a right side view of the hook and weight shown in FIG. 6.

FIG. 9 is a rear view of the hook and weight shown in FIG. 6.

FIG. 10 is a cross-section of the fishing lure of FIG. 3 taken along section line 4—4 shown in FIG. 3 with a hook being inserted into the fishing lure.

FIG. 11 is a cross-section of the fishing lure of FIG. 3 taken along section line 4—4 shown in FIG. 4 shown with the hook and weight inserted into the lure.

DETAILED DESCRIPTION OF PREFERRED EMBODIMENTS

As shown in FIGS. 3–11, this invention is directed to a fishing lure 10 that simulates a natural baitfish or crustaceans when suspended in water. In at least one embodiment, the fishing lure 10 may be an imitation of a shrimp having a configuration enabling the lure to maintain an attitude, or position, of a living shrimp while pulled through the water. The fishing lure 10 may include a hook and weight combination enabling the hook to remain in the body even as the hook is pulled from a line receiving portion of the hook. Thus, the hook remains in position while being cast repeatedly and even after numerous fish have been caught using the lure body.

Figure 1:
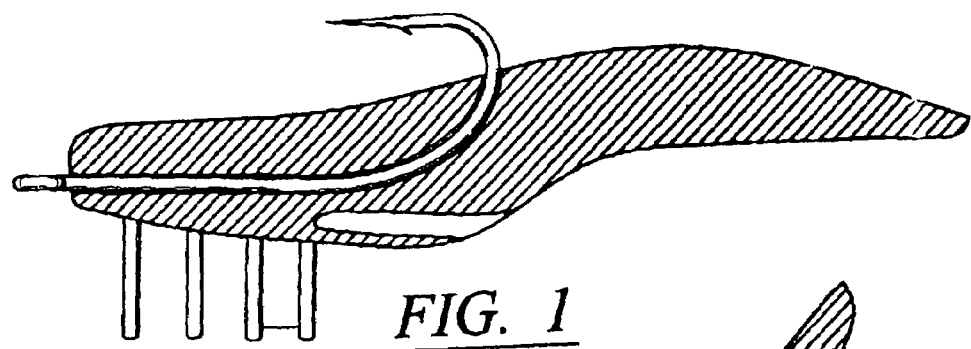
FIG. 1 is a cross-sectional view of a fishing lure of the prior art.
Figure 2:
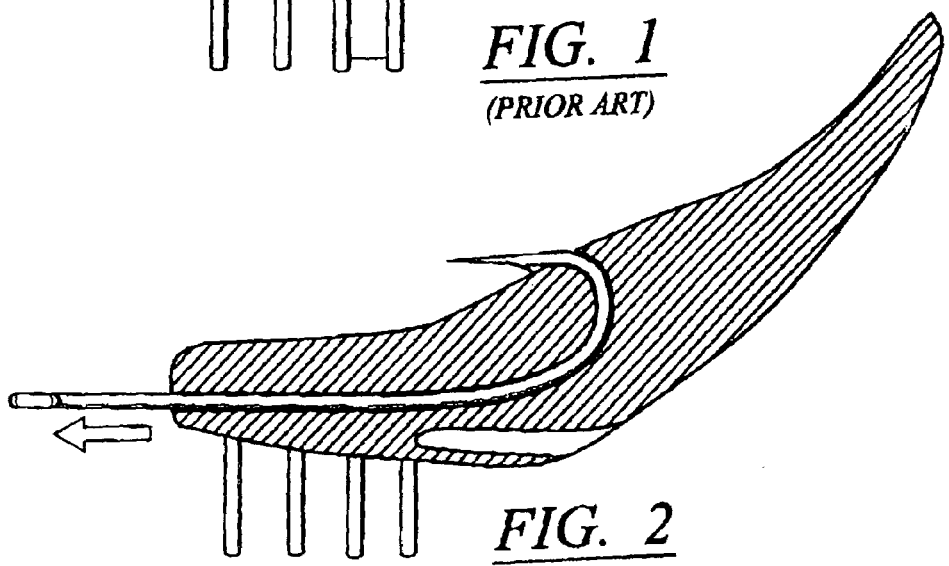
FIG. 2 is a side view of a fishing lure of the prior art with a hook having been pulled out of position due to a damaged lure body.
Figure 3:
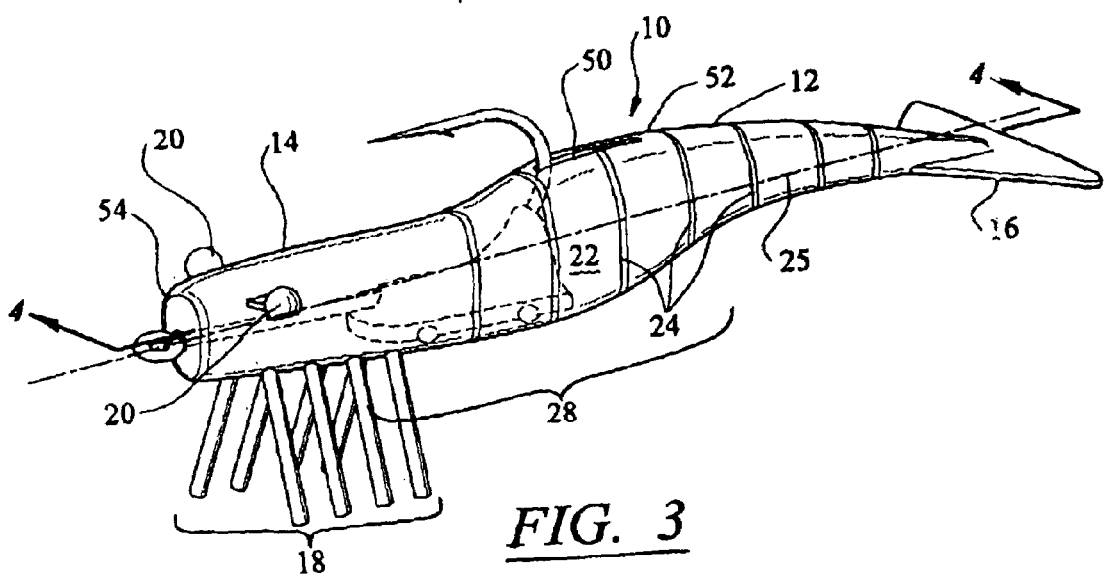
FIG. 3 is a perspective view of fishing lure according to an embodiment of the invention.

The fishing lure 10 may be formed from a body 12 having a head 14, a tail 16, and a plurality of legs 18 extending from the head 14. The tail 16 may be a flat tail, as shown in FIG. 3, a paddle tail, a curly tail, or other appropriate structure. The head 14 may resemble a shrimp head or that of a fish. The plurality of legs 18 may consist of two or more legs, and may be formed from eights legs. The legs 18 may extend from the body in a nonparallel manner. In at least one embodiment, the head 14 may also include a plurality of eyes 20 extending from a side surface 22 of the head 14. The eyes 20 may be a spherically shaped member attached to longitudinal supports extending from the body 12 or formed from another appropriate shape. The eyes 20 may have a color different than other portions of the body 12. The body may be formed from materials, including, but not limited to, plastic, rubber, and other appropriate materials. In at least one embodiment, the materials are flexible.

The body 12 may also include a plurality of ribs 24 extending circumferentially around the body 12 and positioned generally orthogonal to a longitudinal axis 25 of the body 12. In at least one embodiment, the plurality of ribs 24 may be formed from seven ribs; however, in other embodiments ribs, the body 12 may include one or more ribs 24 or no ribs 24 at all.

Figure 4:
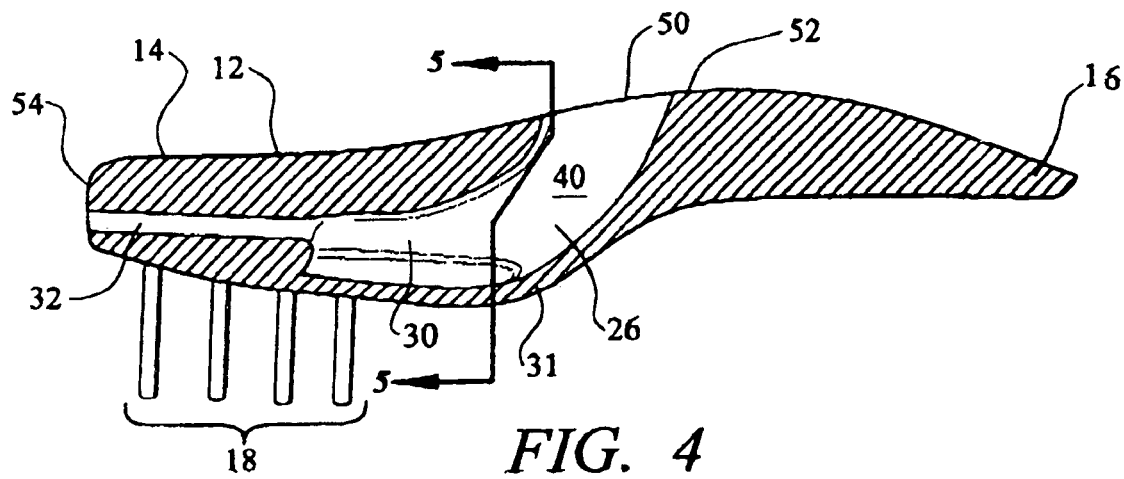
FIG. 4 is a cross-section of the fishing lure of FIG. 3 taken along section line 4—4 shown in FIG. 3 with the hook and weight removed.
Figure 5:
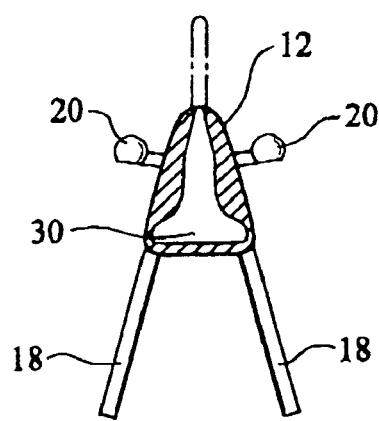
FIG. 5 is a cross-section of the fishing lure taken along section line 5—5 shown in FIG. 4.

The body 12 may also include a cavity 26, as shown in FIGS. 4, 10 and 11. The cavity 26 may be located generally in a midsection 28 of the body 12. The cavity 26 may be formed from a weight containing region 30 configured to receive a weight 34 and a shank containing region 32 configured to receive a shank 36 of a hook 38. As shown in FIG. 5, the cavity 26 may have a modified teardrop cross-section taken at section line 5—5 in FIG. 4. The modified teardrop cross-section may mirror the exterior shape of the weight 34. In at least one embodiment, the cavity 26 may be sized slightly smaller than the weight 34, thereby creating an interference fit to prevent, or at least substantially limit, movement of the weight 34 within the cavity 26.

In at least one embodiment, the cavity 26 may have only a single opening 50 through an outer surface of the body 12. As shown in FIG. 4, the opening 50 may be positioned on a top surface 52 of the body 12. In this embodiment, the bottom aspects of the body 12 may be formed by a wall 31 protecting the weight 34 and the hook 38 when positioned in the cavity 26, thereby preventing the weight 34 from falling out of the cavity 26 or being knocked out of position when the lure 10 is skipped across the surface of the water to position the lure under docks and other overhanging structure.

Inner walls 40 forming the weight containing region 30 may be configured in any shape. However, at least portions of the inner walls 40 may be configured to prevent the hook 38 from being pulled from the body 12 when the hook 38 is pulled at a line receiving portion 42 of the hook 38. Specifically, the inner walls 40 may be configured to fit tightly with the weight 34 and the hook 38. In at least one embodiment, the inner walls 40 forming the cavity 26 may be configured to contact substantially all sides of the weight 34. Particularly, in an embodiment in which the weight 34 has a base 60, as shown in FIG. 9, the cavity 26 may include a wider bottom portion sized to accept the base 60 and enable the base 60 to contact the inner walls 40 of the cavity 26 while the weight 34 is in place in the cavity 26.

Figure 6:
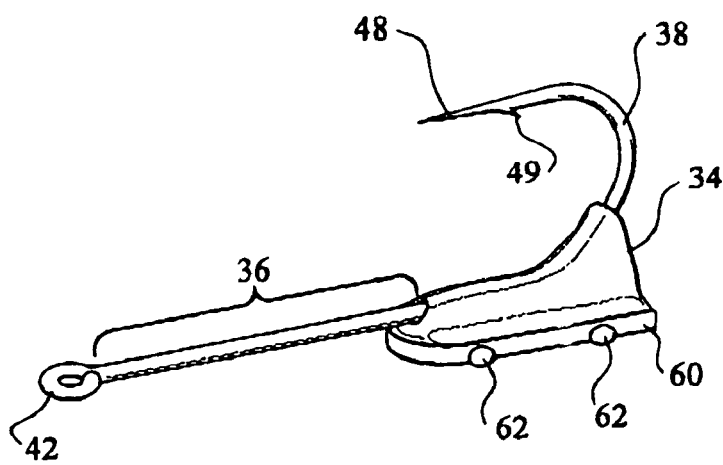
FIG. 6 is a perspective view of a hook and weight according to an embodiment of the invention.
Figure 7:
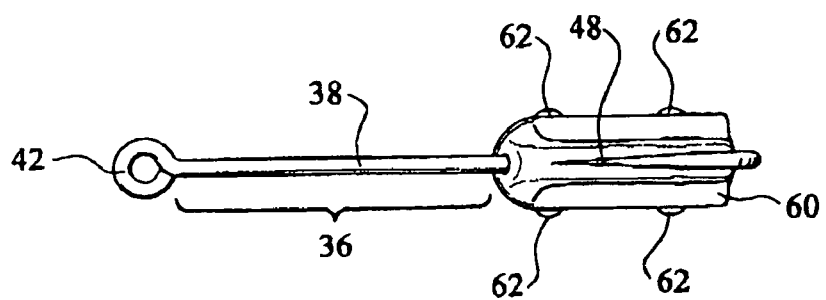
FIG. 7 is a top view of the hook and weight shown in FIG. 6.

The lure 10 may also include the hook 38 and a weight 34 attached to the hook 38. As shown in FIGS. 6–9, the hook 38 may be formed from a line receiving portion 42, a shank 36, a bend 46, a throat 47, and a point 48, and in some embodiments, may also include a barb 49 on the point 48 and one or more barbs 51 on the shank 36. Some embodiments of the hook 38 may include enlarged portions of the bend 46 relative to the shank 36, and other embodiments, may have the shank 36 forming a significant portion of the hook 38, as shown in FIGS. 6–8. In at least one embodiment, the line receiving portion 42 is an eye formed from a substantially circular portion of the shank 36.

The weight 34 may be attached to the hook 38 using a variety of attachment mechanisms, such as soldering, tinning, crimping, adhesives, or others, or may be integrally formed with the hook. The weight 34 may be attached to the hook 38 such that a midpoint 35 of the weight 34 is closer to throat 47 than to the line receiving portion 42 of the hook 38. In this position, the weight 34 may function as a keel when positioned inside the body 12.

The weight 34 may or may not be formed from the same material with which the hook 38 is formed. The weight may be formed from materials such as, but not limited to, lead, tin, tungsten, any combination thereof, and synthetic materials having high densities. The weight 34 may also be formed from numerous sizes such as, but not limited to, about ⅓₂ of an ounce to about two ounces. In at least one embodiment, the weight 34 may be attached to the hook 38 such that at least a portion of the weight 34 is attached to the bend 46. Attaching the weight 34 to at least a portion of the bend 46 prevents the weight from breaking free of the hook 38 when the lure 10 makes sudden contact with a dock piling or other structure causing the lure 10 to stop abruptly.

The weight 34 has a shape enabling the hook 38 to remain in the body 12 when the hook 38 is positioned in the cavity 26, as shown in FIG. 11. For instance, the weight 34 may have a width 56, as shown in FIGS. 7 and 9, that is wider than a width 58 of the hook. In essence, the profile of the weight 34 may be larger than the profile of the hook 38, thereby increasing the resistance of the weight 34 to entering the shank containing region 32. As previously mentioned, the cavity 26 may be configured to contact the weight 34 when the weight 34 is in the cavity 26. In addition, the weight 34 may also extend below the hook 38, as shown in FIGS. 6 and 8. More specifically, in at least one embodiment, a midpoint 35 of the weight 34 may be outside of the hook 38 or, in other words, not in the throat 47 of the hook 38.

The weight 34 may also include a base 60 having a width that is wider than the shank 36. Such width of the base 60 provides stability to the body 12 that is not otherwise characteristic of the body 12. The base 60 may extend at least substantially the entire length of the weight 34, as shown in FIG. 8. By extending the base 60 substantially along the entire length of the weight 34, the ability of the weight 34 to function as a keel within the body 12 is increased. The base 60 may also extend from the weight 34, as shown in FIG. 9, such that the base 60 extends outside of the width of the weight 34. In at least one embodiment, as shown in FIGS. 8 and 9, the base 60 may have a generally planar shape.

The base 60 may include a body saving device 62 for reducing wear by the weight 34 on the body 12. In at least one embodiment, the body saving device 62 may be formed from one or more protrusions 62 for preventing the weight 34 from cutting through the body 12 when the body 12 impacts a piling, rock pile, limb, or other resilient structure. In at least one embodiment, as shown in FIGS. 6–11, the weight 34 may include at least one protrusion 62 on each side of the base 60. The base may also include two protrusions 62 on each side of the base 60. In at least one embodiment, bottom aspects of the weight 34 are covered with material forming the body 12, except for possibly a small hole due to a molding rod. In this embodiment, the weight 34 is protected from falling out of the base of the body 12.

The combined weight 34 and hook 38 may be coupled to the body 12 by inserting the shank 36, as shown in FIG. 10, into the weight containing region 30 of the cavity 26. In at least one embodiment, the shank 36 may be inserted through an opening 50 in a top surface 52 of the body 12. In other embodiments, the shank 36 may be inserted through a thin layer of material forming the body 12. The shank 36 may then be inserted into the shank containing region 32, as shown in FIG. 11. In at least one embodiment, a line receiving portion 42 extends out of a nose 54 of the body 12, as shown in FIGS. 3 and 11, enabling a line to be attached to the lure 10 using a variety of knots, such as, but not limited to, a loop knot, a uni knot, and others.

During use, the lure 10 may be cast and retrieved through the water to simulate a natural baitfish or crustacean. Positioning the weight 34 in a midsection of the lure 10 enables the lure to maintain an upright attitude while be pulled through the water. In other words, the longitudinal axis 25 may be generally horizontal when pulled through the water. Further, positioning the weight 34 on the hook 38 so that the weight 34 is able to be positioned in the midsection 28 of the body 12 enables the weight 34 to function as a keel in keeping the body 12 upright in the water. Maintaining the proper attitude of the lure 10 is important in that a lure 10 lacking proper attitude will spook fish rather than entice a strike. Attaching the weight 34 to the hook 38 enables the lure 10 to be cast and retrieved numerous times without the hook being pulled, entirely or partially, from the body 12 through the shank containing region 32. Further, the lure 10 may be attacked by numerous fish and used to catch numerous fish before the body 12 has been damaged to a point requiring the body to be exchanged for a new body. The weight 34 and hook 38 combination increases the useful life of the body 12.

It should be understood that the examples and embodiments described herein are for illustrative purposes only and that various modifications or changes in light thereof will be obvious to persons skilled in the art, and that such modifications or changes are to be included within the spirit and purview of this application. Moreover, the invention can take other specific forms without departing from the spirit or essential attributes thereof.

I claim:

1. A fishing lure, comprising:
    a body having at least one cavity in a midsection of the body for receiving a weight, a shank containing region extending between the at least one cavity in the midsection of the body and a nose of the body, and at least one opening in a top surface of body;
    a hook having a weight coupled to the hook along a shank of the hook such that the weight is positioned closer to a throat of the hook than to a line receiving portion of the hook;
    wherein the hook is positioned in the at least one cavity such that at least a portion of the weight contacts inner surfaces of the at least one cavity thereby resisting the hook from being pulled from the body through the shank containing region when the hook is pulled at the line receiving portion of the hook;
    wherein the weight coupled to the hook is positioned in the at least one cavity in the body such that a midpoint of the weight is proximate to a midpoint of the lure such that a longitudinal axis of the lure is generally horizontal when the lure is in water;

wherein the at least one cavity includes an inner wall in the midsection of the body having a portion that is generally orthogonal to the shank containing region that prevents the weight from being pulled through the shank containing region;

wherein a leading edge of the weight attached to the hook is generally orthogonal to the shank, and the leading edge of the weight contacts the portion of the cavity that is generally orthogonal to the shank containing region to prevent the hook from being pulled through the shank containing region;

wherein at least a portion of the weight is coupled to a bend of the hook;

wherein the weight further comprises a base;

at least one body saving device coupled to the base; and wherein the body saving device comprises at least one protrusion extending from an outer surface of the base proximate to an edge of the weight positioned proximate to a bottom edge of the body.

2. The fishing lure of claim 1, wherein bottom aspects of the weight are substantially enclosed by the body.

3. The fishing lure of claim 1, wherein the base extends substantially an entire length of the weight.

4. The fishing lure of claim 1, wherein the at least one protrusion comprises at least one protrusion extending from each side of the weight.

5. The fishing lure of claim 4, wherein the at least one protrusion comprises at least two protrusions on a first side and at least two protrusions on a second side generally opposite the first side.

6. The fishing lure of claim 1, wherein the weight is formed from materials selected from the group consisting of lead, tin, and tungsten.

7. The fishing lure of claim 1, wherein the base is aligned generally with the shank of the hook that extends wider than a width of the hook.

8. The fishing lure of claim 1, wherein the body includes a head at a first end, a tail at a second end generally opposite to the first end, and at least one set of legs extending from the head.

9. The fishing lure of claim 1, wherein the body further includes a plurality of ribs extending around the body and positioned generally orthogonal to a longitudinal axis of the body.

10. The fishing lure of claim 1, wherein the at least one cavity includes a weight containing region and a shank containing region extending from the weight containing region toward a nose of the body and sized to allow a shank of the hook to be inserted into the shank containing region but to restrict the weight from being inserted into the shank containing region.

11. The fishing lure of claim 1, wherein the line receiving region is an eye protruding through a leading surface of the body.

12. A fishing lure resembling a shrimp, comprising:
an elongated body configured to resemble a shrimp and having at least one cavity in a midsection of the body, a head, a tail, and a plurality of legs extending from the head;
a hook having a weight coupled to the hook along a shank of the hook such tat the weight is positioned closer to a throat of the hook than to a line receiving portion of the hook;

wherein the hook is positioned in the at least one cavity such that at least a portion of the weight contacts inner surfaces of the at least one cavity thereby resisting the hook from being pulled from the body when the hook is pulled at the line receiving portion of the hook;

wherein the weight coupled to the hook is positioned in the at least one cavity in the body such that a midpoint of the weight is proximate to a midpoint of the lure such that a longitudinal axis of the lure is generally horizontal when the lure is in water to resemble the natural attitude of a shrimp;

wherein the at least one cavity includes an inner wall in the midsection of the body having a portion that is generally orthogonal to the shank containing region that prevents the weight from being pulled through the shank containing region;

wherein a leading edge of the weight attached to the hook is generally orthogonal to the shank, and the leading edge of the weight contacts the portion of the cavity that is generally orthogonal to the shank containing region to prevent the hook from being pulled through the shank containing region;

a base coupled to the weight;

at least one body saving device coupled to the base; and wherein the body saving device comprises at least one protrusion extending from an outer surface of the base proximate to an edge of the weight positioned proximate to a bottom edge of the body.

13. The fishing lure of claim 12, wherein bottom aspects of the weight are substantially enclosed by the body.

14. The fishing lure of claim 12, further comprising an opening in a top surface of the elongated body in communication with the at least one cavity.

15. The fishing lure of claim 12, wherein at least a portion of the weight is coupled to a bend of the hook.

16. The fishing lure of claim 12, wherein the base extends substantially the entire width of the weight, and the base has a width wider than other portions of the weight.

17. The fishing lure of claim 12, wherein the at least one protrusion comprises at least one protrusion extending from each side of the weight.

18. The fishing lure of claim 17, wherein the at least one protrusion comprises at least two protrusions on a first side and at least two protrusions on a second side generally opposite the first side.

19. The fishing lure of claim 12, wherein the weight is formed from materials selected from the group consisting of lead, tin, and tungsten.

20. The fishing lure of claim 12, wherein the at least one cavity includes a weight containing region and a shank containing region extending from the weight containing region toward a leading end of the body and sized to allow a shank of the hook to be inserted into the shank containing region but to restrict the weight from being inserted into the shank containing region.

21. The fishing lure of claim 12, wherein the line receiving region is an eye protruding through a leading surface of the body.

* * * * *

UNITED STATES PATENT AND TRADEMARK OFFICE
CERTIFICATE OF CORRECTION

| | | |
|---|---|---|
| PATENT NO. | : 7,185,457 B2 | Page 1 of 1 |
| APPLICATION NO. | : 10/801350 | |
| DATED | : March 6, 2007 | |
| INVENTOR(S) | : Mark S. Nichols | |

It is certified that error appears in the above-identified patent and that said Letters Patent is hereby corrected as shown below:

In the claims:

Claim 12, column 7, line 61, replace "tat" with --that--.

Signed and Sealed this

Twenty-fourth Day of April, 2007

JON W. DUDAS
*Director of the United States Patent and Trademark Office*